United States Patent
DeSimone et al.

(10) Patent No.: US 6,176,895 B1
(45) Date of Patent: Jan. 23, 2001

(54) POLYMERS FOR METAL EXTRACTIONS IN CARBON DIOXIDE

(76) Inventors: Joseph M. DeSimone, 7315 Crescent Ridge Dr., Chapel Hill, NC (US) 27516; William Tumas, 1130 Big Rock Loop, Los Alamos, NM (US) 87544; Kimberly R. Powell, 103 Timber Hollow Ct. Apartment 323, Chapel Hill, NC (US) 27514; T. Mark McCleskey, 1930 Camino Mora, Los Alamos, NM (US) 87544; Timothy J. Romack, 5810 Forest Ridge Dr., Durham, NC (US) 27713; James B. McClain, 8530 Sommersweet La., Raleigh, NC (US) 27612; Eva R. Birnbaum, 1930 Camino Mora, Los Alamos, NM (US) 87544

( * ) Notice: Under 35 U.S.C. 154(b), the term of this patent shall be extended for 0 days.

(21) Appl. No.: 09/185,891

(22) Filed: Nov. 4, 1998

(51) Int. Cl.[7] .............................. C22B 3/26; C01B 31/20; C08K 3/00; C08F 12/22

(52) U.S. Cl. .......................... 75/723; 423/226; 524/424; 526/245; 526/329.4; 526/328.5; 526/244

(58) Field of Search .......................... 524/424; 528/490, 528/483; 75/721, 723; 423/1, 226, 245.2, 658.5; 526/245, 329.4, 328.5, 244

(56) References Cited

U.S. PATENT DOCUMENTS

| | | |
|---|---|---|
| 4,895,905 | 1/1990 | Schneider et al. ............... 525/154 |
| 5,087,370 | 2/1992 | Schultheis et al. ............... 210/638 |
| 5,221,480 | 6/1993 | Schultheis et al. ............... 210/638 |
| 5,274,129 | 12/1993 | Natale et al. .................... 549/349 |
| 5,356,538 | 10/1994 | Wai et al. ........................ 210/634 |
| 5,561,066 | 10/1996 | Sinha ............................... 436/73 |
| 5,606,724 | 2/1997 | Wai et al. ........................ 423/3 |
| 5,612,431 | 3/1997 | Waddell et al. ................. 526/243 |
| 5,641,887 | 6/1997 | Beckman et al. ................ 546/26.2 |
| 5,730,874 | 3/1998 | Wai et al. ........................ 210/638 |
| 5,770,085 | 6/1998 | Wai et al. ........................ 210/638 |
| 5,872,257 * | 2/1999 | Beckman et al. ................ 546/336 |
| 5,986,015 * | 11/1999 | Midha et al. .................... 525/370 |

FOREIGN PATENT DOCUMENTS

WO 87/02273  4/1987  (WO).
WO 98/34967  8/1998  (WO).

OTHER PUBLICATIONS

DeSimone et al. "Synthesis of Fluoropolymers in Supercritical Carbon Dioxide" *Science* vol. 257 Aug. 1992 pp. 945–947.*

*International Search Report*, PCT/US99/25969, Date of Mailing: Mar. 14, 2000.

Ashraf–Khorassani et al.; Separation of Metal–Containing Compounds by Supercritical Fluid Chromatography, *Anal. Chem.* 59:17 2077–2081 (1987). No Month.

(List continued on next page.)

*Primary Examiner*—Roy V. King
*Assistant Examiner*—Tima McGuthry-Banks
(74) *Attorney, Agent, or Firm*—Myers Bigel Sibley & Sajovec, P.A.

(57) ABSTRACT

A composition useful for the extraction of metals and metalloids comprises (a) carbon dioxide fluid (preferably liquid or supercritical carbon dioxide); and (b) a polymer in the carbon dioxide, the polymer having bound thereto a ligand that binds the metal or metalloid; with the ligand bound to the polymer at a plurality of locations along the chain length thereof (i.e., a plurality of ligands are bound at a plurality of locations along the chain length of the polymer). The polymer is preferably a copolymer, and the polymer is preferably a fluoropolymer such as a fluoroacrylate polymer. The extraction method comprises the steps of contacting a first composition containing a metal or metalloid to be extracted with a second composition, the second composition being as described above; and then extracting the metal or metalloid from the first composition into the second composition.

49 Claims, 1 Drawing Sheet

OTHER PUBLICATIONS

Ashraf–Khorassani et al.; Solubility of metal chelates and their extraction from an aqueous environment via supercritical $CO_2$, *Talanta* 44:755–763 (1997). No Month.

Carrott et al.; High solubility of $UO_2(NO_3)_2$ 2TBP complex in supercritical $CO_2$, *Chem. Commun.* 373–374 (1998). No Month.

Glennon et al.; New fluorinated hydroxamic acid reagents for the extraction of metal ions with supercritical $CO_2$, *Journal of Chromatography A*, 770:85–91 (1997). No Month.

Hawthorne; Report, *Anal. Chem.* 62:11 633A–642A (Jun. 1990).

Lagalante et al.; Solubilities of Copper (II) and Chromium (III) β–Diketonates in Supercritical Carbon Dioxide, *Inorg. Chem.* 34:5781–5785 (1995). No Month.

Laintz et al.; Extraction of Lanthanides from Acidic Solution Using Tributyl Phosphate Modified Supercritical Carbon Dioxide, *Anal. Chem.* 66:13 2190–2193 (Jul. 1994).

Laintz et al.; A Comparison of Liquid and Supercritical Carbon Dioxide as an Extraction Solvent for Plating Bath Treatment, *Anal. Chem.* 70:2 400–404 (1998). No Month.

Meguro et al.; Solubility of Organophosphorus Metal Extractants in Supercritical Carbon Dioxide, *Anal. Chem.* 70:4 774–779 (1998). No Month.

Meguro et al.; Correlation between Extration Equilibrium of Uranium (VI) and Density of $CO_2$ Medium in a $HNO_3$/Supercritical CO2–Tributyl Phosphate System, *Anal. Chem.* 70:4 1262–1267 (1998). No Month.

Saito et al.; Liquid/Solid Extraction of Acetylacetone Chelates with Supercritical Carbon Dioxide, *Bull. Chem. Soc. Jpn.* 63:5 1532–1534 (1990). No Month.

Smart et al. Extraction of Toxic Heavy Metals Using Supercritical Fluid Carbon Dioxide Containing Organophosphorus Reagents, *Ind. Eng. Chem. Res.* 36:1819–1826 (1997). No Month.

Smart et al. Supercritical solutions, *Chemistry in Britain* Aug. 1998 pp. 34–36.

* cited by examiner

POLYMERS FOR METAL EXTRACTIONS IN CARBON DIOXIDE

This invention was made with Government support under Contract Number W-7405-ENG-36 from the Department of Energy. The Government has certain rights to this invention.

FIELD OF THE INVENTION

This invention relates to polymers and polymer compositions useful for the extraction and separation of metals and metalloids (including complexes thereof) with a carbon dioxide fluid, along with methods of using the same.

BACKGROUND OF THE INVENTION

Supercritical fluids have received considerable attention as extraction solvents primarily owing to their desirable mass transfer characteristics Hawthorne, S. B., *Anal. Chem.* 62:633A–642A(1990). Carbon dioxide has received particular interest as a replacement solvent in extraction McHugh, M. A. and Krukonis, V. J., *Supercritical Fluid Extraction: Principles and Practice*, $2^{nd}$ ed., Butterworth-Heinemann, Newton, Mass. (1994). Carbon dioxide is nontoxic, nonflammable, relatively inert, relatively inexpensive on a per extraction basis, and generally environmentally innocuous as compared with typical, often toxic, organic solvents.

One area of interest for the application of carbon dioxide is the reduction of contamination from processes involving metals which is a major environmental challenge. A first aspect of this area involves the remediation of legacy waste discharged into the environment and contained in storage. A second aspect of this area involves developing new environmentally friendly processes upstream which eliminate metal contamination sources. Typical metal solvent extraction techniques used for both remediation and processing involve the generation of additional solvent waste streams. Herein lies an opportunity to affect both ongoing processes involving metals and decontamination methods by taking advantage of carbon dioxide as an ideal replacement solvent.

Carbon dioxide is, however, a nonpolar solvent and consequently not capable of dissolving highly polar species such as metal ions. In traditional solvent extraction systems, chelating agents are utilized to bind the metal ions forming neutral metal complexes capable of dissolving in nonpolar organic solvents. As a nontraditional solvent, carbon dioxide poses its own difficulties with regard to appropriate chelating agents to achieve solubility of metal species. The vast majority of the work in this area has focused on utilizing conventional solvent extraction chelating agents such as dithiocarbamates, β-diketones, crown ethers, and organophosphorous compounds U.S. Pat. No. 5,087,370, U.S. Pat. No. 5,221,480, U.S. Pat. No. 5,356,538, U.S. Pat. No. 5,770,085, U.S. Pat. No. 5,730,874, U.S. Pat. No. 5,606,724, U.S. Pat. No. 5,561,066, Saito et al, *Bull. Chem. Soc. Jpn.* 63:1532–1534 (1990), and Smart et al, *Ind. Eng. Chem. Res.* 36:1819–1826 (1997). Typically a large excess of the chelating ligand or a cosolvent is required. $UO_2(NO_3)_2 \cdot 2TBP$ appears to be an isolated example of one particularly highly $CO_2$-soluble complex Carrott, M. J. et al *Chem. Commun.* 373–374 (1998). When TBP was used in a more general study for the extraction of lanthanides, greater than 10% TBP in $CO_2$ as a solvent modifier was necessary to effect extractions higher than 25% Laintz, K. E. et al, *Anal. Chem.* 66:2190–2193. Fluorinated analogs of dithiocarbamate and β-diketone chelating agents have shown enhanced solubility in $CO_2$ over their hydrocarbon counterparts although a large excess of ligand is still necessary to improve extraction efficiency. This enhanced solubility is likely related to the enhanced volatility of metal complexes with fluorinated ligands. Lagalante, A. F. et al *Inorg. Chem.* 34:5781–5785 (1995). In some instances liquid $CO_2$ may serve as a more attractive medium due to lower operating pressures.

Several studies have addressed the performance of chelating agents in liquid carbon dioxide extraction of metals. Laintz et al *Anal. Chem.* 70:440–404 (1998) found that liquid and supercritical carbon dioxide at the same density have comparable efficiencies for the extraction of nickel and zinc from spent plating bath solutions using acetylacetone and its fluorinated analog. Yadzi and Beckman U.S. Pat. No. 5,641,887 have developed a number of picolylamine, dithiol, and dithiocarbamate derivatives of Krytox acids that are soluble in liquid carbon dioxide. Similarly derivatized polysiloxanes were found to be much less soluble in $CO_2$ than the fluorinated polyether Krytox chelates.

Clearly, both liquid and supercritical carbon dioxide have desirable qualities as extraction solvents. Therefore, the need for chelating agents useful for carbon dioxide systems, especially for relatively low pressure operations, is evident.

SUMMARY OF THE INVENTION

A first aspect of the present invention is a composition useful for the extraction of metals and metalloids. The composition comprises (a) carbon dioxide (preferably liquid or supercritical carbon dioxide); and (b) a polymer in the carbon dioxide, the polymer having bound thereto a ligand that binds the metal or metalloid; with the ligand bound to the polymer at a plurality of locations along the chain length thereof (i.e., a plurality of ligands are bound at a plurality of locations along the chain length of the polymer). The polymer is preferably a copolymer, and the polymer is preferably a fluoropolymer such as a fluoroacrylate polymer.

A second aspect of the present invention is a method of extracting metals and metalloids. The method comprises the steps of (a) contacting a first composition containing a metal or metalloid to be extracted with a second composition, the second composition being as described above; and then (b) extracting the metal or metalloid from the first composition into the second composition. The first composition may be in any form, such as a solid, a liquid, a slurry, etc., and may be heterogeneous or homogeneous.

A third aspect of the present invention is a composition comprising: (a) carbon dioxide (preferably liquid or supercritical carbon dioxide); (b) a polymer in the carbon dioxide, the polymer having bound thereto a ligand that binds the metal or metalloid; with the ligand bound to the polymer at a plurality of locations along the chain length thereof; and (c) a metal or metalloid bound to the polymer by the ligand (i.e., a plurality of the metals or metalloids are bound to the polymer by virtue of a plurality of the ligands being bound to the polymer).

A fourth aspect of the present invention comprises a method for the separation of metals and metalloids from a carrier medium. The method comprises: (a) providing a composition comprising (i) carbon dioxide, (ii) a polymer in the carbon dioxide, the polymer having bound thereto a ligand that binds the metal or metalloid; with the ligand bound to the polymer at a plurality of locations along the chain length thereof, and (iii) a metal or metalloid bound to the polymer by the ligand; and then (b) separating the polymer from the carbon dioxide.

The present invention is explained in greater detail in the drawings herein and the specification below.

DETAILED DESCRIPTION OF PREFERRED EMBODIMENTS

Carbon dioxide used to carry out the present invention may be in a gas, liquid, or supercritical state. Liquid and supercritical carbon dioxide are preferred, and liquid carbon dioxide is particularly preferred. A cosolvent may be added to the carbon dioxide if desired.

Cosolvents that may be used in carrying out the present invention are typically organic cosolvents such as methanol, ethanol, ethyl acetate, tetrahydrofuran, alcohols, liquid alkanes, methylene chloride, chloroform, toluene, water, ketones, and esters.

"Soluble" as used herein with respect to the solubility of the polymers in the carbon dioxide (with or without the cosolvent) is specifically intended to include both fully soluble and partially soluble polymers, as long as some of the polymer is solubilized in the carbon dioxide. The polymer may be soluble in the carbon dioxide (and in some embodiments is preferably soluble in the carbon dioxide), or may be included in the form of an emulsion, suspension, microemulsion, dispersion, etc. Additionally, the polymer may exist in the carbon dioxide in the form of micelles or reverse micelles.

Metals that may be used to carry out the present invention are elements that form positive ions in solutions, and produce oxides that form hydroxides rather than acids with water. Metals include alkali metals such as sodium and potassium, alkali-earth metals such as magnesium and calcium, transition metals such as copper, nickel, titanium, iron, molybdenum, mercury, and zinc, noble metals (including the precious metals gold, platinum and silver), rare metals, rare-earth metals (lanthanides), actinides (including the transuranic metals), light metals, heavy metals, synthetic metals and radioactive metals such as uranium. Lanthanides and actinides are collectively referred to as the f-group elements herein from the filling of their 4f and 5f orbitals.

Metalloids that may be used to carry out the present invention are elements with both metallic and non-metallic properties and include arsenic, selenium and tellurium.

The terms "metal" and "metalloids" as used herein include complexes thereof (e.g., cationic complexes, anionic complexes), as in the case of uranyl.

Polymers that may be used to carry out the present invention are preferably polymers that contain a $CO_2$-philic group, and which polymers are soluble in carbon dioxide. Examples of $CO_2$-philic groups include silicone-containing groups or polysiloxanes, halogen (particularly fluorine) containing groups or halo (particularly fluoro)carbons, and branched polyalkylene oxides. The polymers may consist entirely of the $CO_2$-philic group, or may be a copolymer of a $CO_2$-philic group and a group that is not otherwise soluble in $CO_2$ (thus the term "polymer" as used herein includes "copolymer"). Copolymers may be of any type, including random copolymers, block copolymers, graft copolymers, etc. The polymer may be linear or branched. Such polymers are known. See, e.g., U.S. Pat. No. 5,739,223 to DeSimone (Method of Making Fluoropolymers); see also U.S. Pat. No. 5,676,705 to Jureller et al. Fluoropolymers, particularly fluoroacrylates, are preferred (including the copolymers thereof).

Ligands that may be used to carry out the present invention include any ligand that will bind to, complex with, or coordinate with a metal or metalloid as described above. The ligand is typically a group that is, or forms, an anion or a polar group in the composition so that it is capable of binding the charged metal or metalloid. Such ligands include β-diketone, phosphate, phosphonate, phosphinic acid, alkyl and aryl phosphine oxide, thiophosphinic acid, dithiocarbamate, amino, ammonium, hydroxyoxime, hydroxamic acid, calix(4)arene, macrocyclic, crown ether, 8-hydroxyquinoline, picolylamine, thiol, and carboxylic acid ligands. The ligand may be bound, preferably covalently bound, to the polymer in accordance with known techniques such as copolymerization of a monomer containing a ligand with a $CO_2$-philic monomer, derivatization of a homopolymer, derivatization of a copolymer, or other variations thereof that will be apparent to those skilled in the art based on the disclosure provided herein. Multiple types of ligands may be incorporated onto the same polymer backbone. The ligand may be monodentate or polydentate; hence the ligand itself may be a chelating agent. Chelating agents may be O-donating chelating agents such as cupferron, chloroanillic acid and related agents, β-diketones, N-benzoyl-N-phenylhydroxylamine agents, macrocyclic compounds, etc; N-donating agents such as α-dioximines, diaminobenzidine and related reagents, porphyrines and related agents, etc; O,N-donating agents such as 8-hydroxyquinoline, nitrosonaphthols and nitrosophenols, ethylenediaminetetraacetic acid (EDTA) and other complex ionates, diphenylcarbazide and diphenylcarbazone, azoazoxy BN, etc.; S-donating chelating agents such as sodium diethyldithiocarbamate and related agents, dithiazone and related agents, bismuthiol II, thiothenoyltrifluoracetone, thioxine, etc.; and P-donating chelating agents such as tributylphosphate and related agents, etc.

Figure 1:
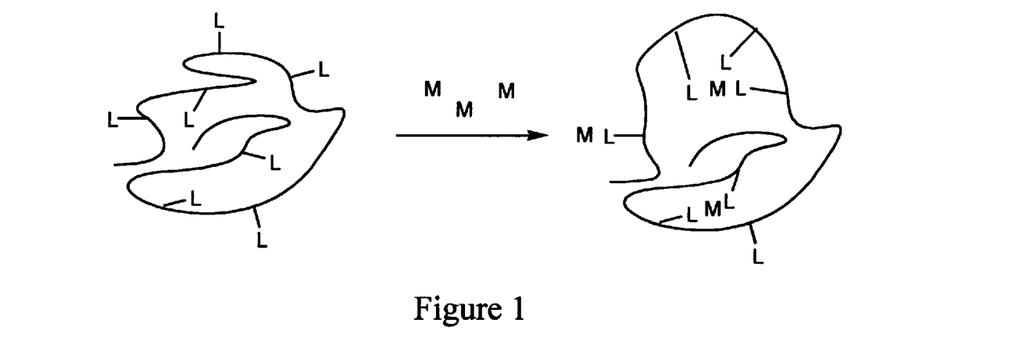
FIG. 1 schematically illustrates a polymer of the present invention in liquid carbon dioxide, before and after metal binding, with the ligand being represented as "L" and the metal being represented as "M".

As illustrated in FIG. 1, the present invention provides a carbon dioxidesoluble polymer capable of binding metals or metalloid species in carbon dioxide. The polymer is comprised of a $CO_2$-philic backbone with a plurality of pendant functional groups "L", shown distributed along the chain length of the polymer, that can serve as ligands for coordination of metal "M". While the polymer shown is linear, it could also be branched. Also, ligand sites on different polymers could be bound to a single metal. In one preferred embodiment, each polymer molecule has at least 10 or 20 ligands L bound thereto. There is no critical upper limit on the number of ligands L bound to each polymer molecule, but the number may be (for example) up to 1,000 or 2,000, or even 5,000 or more.

In general, the polymer is included in the composition in an amount of from about 0.01 or 0.1 percent to about 20, 30, 40 or 50 percent by weight. When included, the cosolvent is included in the composition in an amount of from about 0.001, 0.01, or 0.1 percent to about 5, 10, 20 or 30 percent by weight. Extraction of the metal or metalloid is carried out by (a) contacting a first composition (which may be liquid or solid) containing a metal or metalloid to be extracted with a second composition, the second composition being as described above (preferably a liquid or supercritical fluid); and then (b) extracting the metal or metalloid from the first composition into the second composition. The contacting and extracting steps may be carried out in accordance with known techniques, and each may independently be a continuous step or a batch step. It is not necessary that all of the metal or metalloid be extracted from the first composition into the second composition, as long as a sufficient amount is transferred from one to the other to render the process useful in the intended environment. The extracting step may be followed by separating the first composition from the second composition, and/or separating the carbon dioxide from the polymer. Finally, the metal or metalloid may be separated from the polymer after the extraction step, with or without separating the polymer from the carbon dioxide (and before or after the polymer is separated from the carbon dioxide).

The contacting and extracting steps may be carried out at any suitable temperature and pressure, but are preferably carried out at a temperature of from about −78.50° 0° C. to about 20° or 100° C., and at pressures of from about 14.7 or 500 psi to about 10,000 psi.

Compositions comprising carbon dioxide, polymer, and metal or metalloid bound to the polymer are useful both as intermediates for the separation of the metal or metalloid, and as a means of providing a metal-containing polymer per se in a carbon dioxide carrier medium (for example, where the metal is a conductor such as copper). Such compositions comprise the polymer, and optional cosolvents, in the amounts given above. The amount of the metal in the composition may be relatively small depending upon the purpose thereof, and is not critical, but for example may be from about 0.001 to 10,000 micromolar.

The polymer and/or metal may be separated from the composition by any suitable means, depending upon whether or not it is ultimately desired to retain the metal in the polymer. For example, the carbon dioxide can be simply vented into the atmosphere to provide the polymer in separate, isolated, concentrated form. The composition can be sprayed onto a substrate to coat the substrate with the polymer. The metal can be separated from the polymer in the carbon dioxide by manipulating pressure, temperature, and/or pH, etc.

In a preferred embodiment of the invention, the $CO_2$-philic backbone is primarily comprised of a fluoropolymer such as those derived from fluorinated acrylate or methacrylate monomers (R=H, Me; n=1, 2; m=1–10). Other suitable $CO_2$-soluble materials for the composition of the polymeric backbone include fluorinated ethers, silicones, and phosphazenes.

(I)

Synthesis of the metal binding polymer can be carried out by random copolymerization of a suitable monomer for the $CO_2$-philic backbone with a comonomer bearing a functional group capable of serving as a ligand or a point of attachment for a ligand. For example, a random copolymer composed of telomer acrylate-n (TA—N) (a fluorinated acrylate monomer) and 2-(methacryloyloxy)ethyl acetoacetate (a ligand bearing monomer) can be synthesized via free radical solution polymerization initiated by 2,2'-azobisisobutyronitrile (AIBN) in ααα-trifluorotoluene (TFT) at 60° C. U.S. Pat. No. 4,500,601 describes the copolymerization of monomers bearing a chelating moiety with other non-chelating monomers such as acrylates and methacrylates. These copolymers are used in metal coatings applications, and metal extraction applications are not described.

Most preferably, the copolymer of the present invention is a linear random copolymer although alternating, block, graft or crosslinked copolymers of appropriate composition may be suitable for solubilizing metals in carbon dioxide as well. The copolymers may be prepared by any of a number of suitable processes such as bulk, suspension, or emulsion polymerization although in a preferred embodiment of the present invention the copolymers are prepared by solution polymerization. Most preferably, the polymerization solvent is either carbon dioxide or a fluorous solvent such as TFT. Typical free radical initiators used for the polymerization are those capable of catalyzing the polymerization at temperatures in the range of 50° C. to 70° C. such as AIBN, lauroyl peroxide, benzoyl peroxide, and the like. The amount of initiator can be varied but is normally 1 mol %. A range of 0.1–2% based on total monomer weight is preferred.

The amount of functionalized comonomer incorporated can be varied. Preferably, the comonomer is present in the range of 1 mol % to 40 mol %. More preferably, the range is 5 mol % to 25 mol %. Solubility of the random copolymers can vary depending on the comonomer incorporated. Most preferably, the percentage of comonomer in the random copolymer is such that at room temperature a liquid $CO_2$ solution of a least $10^{-2}$ M in functional moiety can be prepared at 2500 psi or lower.

Preferred functional groups include: hydroxy, acetoacetate, acetylacetone, phosphonate, phosphate, epoxy, halogen, acid chloride, amino, ammonium, imidazole, pyridine, bipyridine, thiol, carboxylic acid, dithiocarbamate, calix(4)arene, and picolylamine. Preferably, the ligand or point of attachment for the ligand is incorporated in a monomer with a site of ethylenic unsaturation. More preferably, the monomer is a styrenic (II) or vinyl monomer (III). Styrenic monomers include 3 or 4vinyl benzyl acetylacetone and 3 or 4-vinyl benzyl chloride. Vinyl monomers include 1-vinylimidazole, 2- or 4-vinyl pyridine, 4-methyl-4'-vinyl-2,2'-bipyridine, N-vinylpyrrolidone.

Most preferably, the ligand is a functionalized acrylate or methacrylate monomer (IV) R=H or Me, n=1–10, RL=OH, $NR_2$, X (where X=halogen), $NR_3X$, acetoacetate, epoxy, and 5-(oxy methyl)-25,26,27,28-tetra(2-ethoxyethyl)calix(4)arene. Other preferred monomers include 8-hydroxyquinoline, salicylaldehyde, salicylideneaniline, 2-(2'-pyridyl)benzimidazole, salicylic acid and acetyraceto- nate derivatives of acrylates and methacrylates reported in U.S. Pat. No. 4,500,601. Acryloyl chloride and methacryloyl chloride may also be utilized as functional comonomers for the attachment of a wide range of ligand groups.

(IV)

Functional groups that can serve as ligands without further derivation after polymerization include hydroxy, acetoacetate, acetylacetone, imidazole, pyridine, bipyridine, amino, and ammonium. Additionally, polymer derivatization reactions can also be carried out on the random copolymers to convert nonligand functional groups into ligands or ligands into different ligands. A few examples of ligands that may be attached in this manner (illustrated below) are phosphate (V), ammonium (VI), pyrazole (VII), phosphonate (VIII), acetylacetonate (IX), thiol (X), amino pyridine (XI), diol (XII), and dithiocarbamate (XIII).

The copolymer may be composed of a $CO_2$-philic monomer and a single type of functional comonomer or a mixture of comonomers each with a different functional group. For example, both acetoacetate and dimethylamino groups can be incorporated into a single $CO_2$ soluble polymer by random copolymerization of TAN monomer, 2-(methacryloyloxy)ethyl acetoacetate, and 2-(dimethylamino)ethyl methacrylate.

(V)

(VI)

(VII)

(VIII)

(IX)

(X)

(XI)

(XII)

(XIII)

Extractions can be carried out with any combination of functional random copolymers. For instance, a random copolymer with phosphonate ligands and a random copolymer with acetylacetonate groups can be combined in a single extraction. Likewise, mixed ligand random copolymers can be combined. The individual random copolymers may be targeting different metals or the same metal species within one extraction batch.

The polymer may be dissolved, solubilized or suspended in carbon dioxide prior to contact with the metal containing matrix (or first composition). Alternatively, the polymer may be contacted with the metal prior to addition of carbon dioxide. Extractions may be carried out under static and/or dynamic extraction conditions by liquid liquid or liquid solid extraction.

Carbon dioxide extractions may be modified by the addition of a cosolvent (or entrainer), a coligand for the metal, a conditioning agent or any combination of the three. The addition of small amounts of low to medium boiling alcohols or esters such as methanol as cosolvents is known to increase the efficiency of carbon dioxide in the extraction of polar compounds. A chelating agent (such as described above) may be added as a coligand for the metal bound polymer or as a cosolvent. Numerous chelates such as acetylacetone are commercially available. Conditioning agents such as oxidizing agents or reducing agents can be added to effect the oxidation state of the metal(s) during extraction.

The addition of a coligand is desireable in those embodiments where it is desired to inhibit cross-linking of the polymer molecules by the metal. Such cases include situations where it is desireable that the polymer be solubilized in the carbon dioxide both before and after extraction of the metal, where it is desired to inhibit agglomeration of the polymer, etc. When used, the coligand can be incorporated in any suitable amount (for example, from 0.001, 0.01 or 0.1 to 1, 5, 10 or 20 percent by weight).

In another embodiment, it may be desired to employ a polymer selected so that the polymer does cross link upon binding and extraction of the metal. Such an effect would be employed when it is desired to facilitate separation of the metal by agglomeration or precipitation of the polymer from the carbon dioxide.

$CO_2$-soluble random copolymers of the present invention and their metal chelates may be separated from the carbon dioxide and provided in solid form convenient for recycling. Post extraction, venting of the extraction solvent leads to precipitation of the solid polymer bound metal. After treatment to remove the metal from the polymer, filtration can be used for facile recovery of the solid polymer for reuse. This method avoids the recycling of liquids and noxious fumes associated with such chelates as TBP.

In addition, the $CO_2$-soluble polymers of this invention and their metal chelates have numerous applications beyond metal and metalloid extractions. Such applications include the use of the functional polymers for coatings, metal working, and metal cleaning applications including those associated with microelectronics applications. The polymers with complexed metal could be deposited from $CO_2$ as coatings or used for devices. Additionally, the fluorous nature of the fluorine-containing $CO_2$-soluble polymers, with or without chelated metals, lend themselves to applications in fluorous solvents or $CO_2$/fluorous solvent combinations.

While the present invention has been described with carbon dioxide as the fluid, any material that is a gas at standard temperature and pressure (STP) but can be transformed to a liquid or a supercritical fluid under increased (i.e., superatmospheric) pressure can be used instead of the carbon dioxide fluid in the present fluid. The fluid preferably is one that is not harmful to the atmosphere and is non-toxic towards humans, animals, and plants when vented or released. Other such fluids include $CO_2$, hydrofluorocarbons (HFCs) and perfluorocarbons (e.g., perfluoropropane and perfluorocyclobutane) that are gasses at STP, hydrocarbons that are gases at STP, polyatomic gases, noble gases, and mixtures thereof. Useful polyatomic gases include $SF_6$, $NH_3$, $N_2O$, and CO. Most preferred reaction fluids include $CO_2$, HFCs, perfluorocarbons, and mixtures thereof. Examples of useful HFCs include those that are known to be good solvents for many small organic compounds, especially those HFcs that comprise from 1 to 5 carbon atoms. Specific examples include 1,1,2,2-tetrafluoroethane, 1,1,1,2-tetrafluoroethane, trifluoromethane, and 1,1,1,2,3,3,-heptafluoropropane. Compatible mixtures of any two or more of the foregoing also can be used as the fluid. $CO_2$ is most preferred, and where mixtures are employed then mixture that comprise at least about 40 or 60 percent $CO_2$ are preferred.

The present invention is explained in greater detail in the following nonlimiting Examples.

EXAMPLE 1

Random Copolymer Synthesis

Carbon dioxide soluble random copolymers with functional groups that can serve as ligands or points of attachment for ligands are synthesized. Functional groups are incorporated in a $CO_2$-soluble polymer by random copolymerization of a fluorinated acrylate monomer with an acrylate or methacrylate comonomer bearing a functional substituent such as acetoacetate, dimethylamino, hydroxy, bromo, and epoxy. Copolymers are prepared with 5, 10, 15, and 25 mol % comonomer compositions.

A representative synthesis is given for the 5 mol % acetoacetate functionalized $CO_2$-philic polymer. The fluorinated acrylate monomer telomer acrylate-N (TA—N), $CH_2CHCO_2(CH_2)_2(CF_2)_{5-9}CF_3$ (DuPont), was passed through a column of alumina under a nitrogen atmosphere. A warm water jacket on the column was used to maintain the monomer as a liquid during purification. The comonomer, 2(methacryloyloxy)ethyl acetoacetate (97%, Aldrich), was also purified by passing through an alumina column under $N_2$. A flame dried 200 mL round bottom flask was charged with 10 g (19 mmol) of TA—N monomer and 100 mL of α,α,α-trifluorotoluene (TFT) (99+% pure, Aldrich) that had been sparged with nitrogen immediately prior to use. 2-(methacryloyloxy)ethyl acetoacetate (0.19 mL, 1 mmol) was added via syringe to the stirred solution of TA—N monomer. 1 mol % initiator, azobisisobutyro-nitrile (AIBN) (Kodak, recrystallized from methanol) (0.033 g, 0.2 mmol), was added as a solid. The solution was heated at 60° C. for approximately 20 hours. The polymer was precipitated in MeOH, filtered, and dried in vacuo.

Functional polymers with acetylacetone, hydroxy, amino, bromo, and epoxy groups are synthesized analogously from 3-vinylbenzyl acetylacetone, 2(dimethylamino)ethyl methacrylate (DMAEMA) (98%, Aldrich), 2-hydroxyethyl methacrylate (HEMA) (97%, Aldrich), 2-bromoethyl acrylate (BEA) (Polysciences, Inc.), glycidyl methacrylate (GMA) (97%, Aldrich), respectively.

EXAMPLE 2

Solubility Studies

Point solubility studies were carried out in liquid and supercritical carbon dioxide (Air Products and Chemicals, Inc., SFC/SFE grade used without further purification) in a 2.5 mL high-pressure view cell equipped with sapphire windows for visual observation of the solution turbidity. 5, 10, 15, and 25 mol % loaded polymers exhibited the following solubility characteristics at 4 wt % in $CO_2$. Results are given in Table 1 below.

TABLE 1

Solubility of TA—N Random Copolymers in Carbon Dioxide (4 wt %)

| 0° C. | | 25° C. | | 60° C. | |
|---|---|---|---|---|---|
| vapor pressure | 1000 psi | 1800 psi | 2000 psi | 5000 psi | |
| soluble* | insoluble | soluble# | insoluble | soluble* | |

*25 mol % acetoacetate polymer insoluble,
25 mol % epoxy polymer insoluble; 15% and 25% acetylacetone are also insoluble.

EXAMPLE 3

Polymer Derivatization

Derivatization reactions may be carried out on copolymers to attach new ligands at functional sites. The bromo functionalized copolymer prepared in Example 1 was converted to a phosphonate functionalized copolymer. A 50 mL round bottom flask was charged with 10 mol % BEA copolymer (3.00 g) and excess triethylphosphite (Aldrich) (0.106 mL, 0.103 g, 0.6 mmol). The flask was fitted with a reflux condenser and the neat mixture was heated at reflux for 2 hours. Volatiles were distilled in vacuo at 90° C. The resulting phosphonate polymer was characterized by $^{31}P$ NMR using 1,1,2-trifluorotrichloroethane (Freon-113) as the solvent with a $C(O)(CD_3)_2$ insert. Multiple broad phosphorus resonances are indicative of phosphonate substitution.

Along with the diethyl phosphonate product [—P(O)(OEt)$_2$], two additional hydrolysis products [—P(O)(OEt)(OH)] and [—P(O)(OH)$_2$] may be present.

EXAMPLE 3

Metal Sample Preparation

For solid copper nitrate extractions Cu(NO$_3$)$_2$.2H$_2$O was weighed and placed in the extraction vessel. The large crystals were then pulverized using a spatula. Filter paper samples were prepared by spiking a 1 cm×1 cm square of Whatman 42 filter paper with an aqueous stock solution of copper nitrate applied using a microsyringe. The filter paper was allowed to air dry overnight. The stock solution was diluted and analyzed by ICP-AES. A representative filter paper sample prepared in same manner as the sample used in the extraction was treated with 1:1 nitric acid solution overnight. The acid solution was diluted and analyzed by ICP-AES to determine the initial amount of metal deposited on the matrix.

EXAMPLE 4

Batch Extractions

A high pressure vessel (20 mL or 6.4 mL) with three sapphire windows was charge with a copper nitrate sample (crushed solid or filter paper) and polymer (acetoacetate or acetylacetone) along with a TEFLON® polymer coated magnetic stir bar. The cell was pressurized to 2000 psi using an ISCO pump. In all extractions the polymer dissolves completely in CO$_2$, and no precipitation of the polymer is observed as long as the the pressure is maintained at 2000 psi. Stirring of the mixture of polymer solution and copper nitrate sample was interupted periodically for UV-vis spectroscopy studies. Separation of the polymer from the remaining copper salts was not attempted until the amount of copper in solution had reached a maximum as judged by UV-vis. Typically, the extraction was stirred for at least three days and up to ten days.

EXAMPLE 5

Separations

Two techniques were investigated for the separation of the polymer with chelated metal from the residual copper salts. The first technique was to flush the polymer out of the cell by dynamically flowing CO$_2$ through the cell with the CO$_2$ and polymer exiting the cell through a stainless steel tube inserted into a flask or vial of CFCl$_2$CF$_2$Cl. Purging with CO$_2$ continued until all of the polymer had been removed as judged by examining the cell window of the depressurized cell for residual polymeric material. This method suffered from typical restrictor clogging problems. A different technique was tested in the 10% acetylacetone extraction with spiked filter paper sample. A 0.5 $\mu$ in-line filter was used to connect the extraction cell (20 mL) with an empty cell (6.4 mL). A valve between the two cells was opened, and the pressure was allowed to equilibrate between the two cells. The valve was closed again, and CO$_2$ was added to the 20 mL cell to bring the pressure back up to 2000 psi. The pressure between the two cells wsd equilibrated again, and the procedure was repeated until the pressure in both cells reached 2000 psi. The receiving cell was then depressurized by bubbling through CFCl$_2$CF$_2$Cl to capture any polymer flushed out of the cell. This procedure of emptying the extraction vessel into the receiving cell was repeated until the receiving cell had been emptied 7 times (over two 20 mL cell volumes). Both cells were then depressurized. The polymer was collected from the receiving cell by rinsing with CFCl$_2$CF$_2$Cl, and the filter paper was collected from the extraction vessel for analysis.

EXAMPLE 6

Analyses

In extractions carried out with pulverized solid copper nitrate, residual copper nitrate was removed from the cell by rinsing with deionized water (several cell volumes). The aqueous rinses were combined and diluted to a known volume for ICP-AES analysis (Varian Liberty). Filter paper samples with residual copper nitrate were allowed to stand over night in 50% nitric acid, followed by dilution, and ICP-AES analysis. Residual polymer was visible on filter paper samples post-extraction and separation. Both the filter paper from the acetoacetate and the acetylacetone extractions was suspended in 50% nitric acid solution. This is in contrast to the control filter paper sample (not exposed to polymer) which settled to the bottom of the solution upon treatment with nitric acid.

EXAMPLE 7

Copper Extraction Studies

Figure 2:
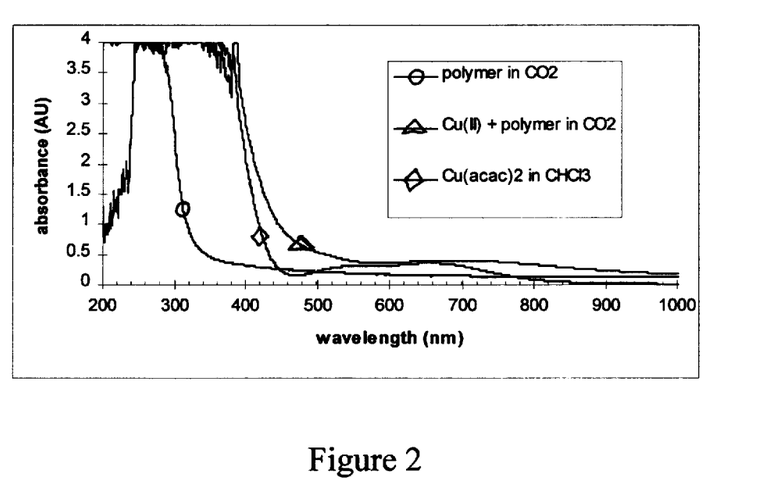
FIG. 2 graphically illustrates the extraction of copper in carbon dioxide with a polymer of the present invention.

A 7 mL high pressure cell was charged with large blue crystals of Cu(NO$_3$)$_2$.2(H2O) (composition determined by ICP-AE) (0.030 g, 0.13 mmol, 1 equiv.). Copper nitrate crystals were pulverized, and 10 mol % acetoacetate functionalized copolymer (1.28 g, 0.26 mmol acetoacetate functionality, 2 equiv.) was added to the cell. The cell was pressurized to 2000 psi at 25° C. A magnetic stirrer was used to agitate the mixture with all of the polymer dissolving readily. The extraction of copper(II) into CO$_2$ was monitored by UV-vis spectroscopy. Data are given in FIG. 2. Absorbances at about 350 nm and 700 nm are indicative of copper(II) binding to the acetoacetate functionalized polymer. Uptake of copper(II) is surface area dependent, but initial uptake appears rapid (minutes) although the level of copper in solution continues to increase with extented stirring (days). After the maximum concentration of copper in solution under static conditions had been reached, the polymer with bound copper was flushed from the cell by flowing pure CO$_2$ through the system. 0.007 g (0.03 mmol, 0.2 equiv) of solid copper nitrate was recovered from the extraction vessel indicating nearly quantitative extraction of copper. Additional data is given in Table 1 below.

TABLE 1

Batch extractions of copper nitrate (2000 psi $CO_2$ at 25° C.)

| polymer | acetoacetate 15% | acetoacetate 15% | acetylacetone 10% | acetylacetone 10% |
|---|---|---|---|---|
| amt (g) | 0.164 | 0.164 | 0.200 | 1.300 |
| mmol ligand/ g polymer | 0.318 | 0.318 | 0.205 | 0.205 |
| ligand (mmol) | 0.0522 (2.7 equiv)# | 0.0522 (0.96 equiv)# | 0.0410 (1.1 equiv)# | 0.267 (1.2 equiv)# |
| sample | filter paper | solid | filter paper | solid |
| cell vol (mL) | 20.0 | 6.4 | 20.0 | 6.4 |
| $Cu^{2+}$ added | 1.21 mg (0.0190 mmol) | 3.44 mg (0.0541 mmol) | 2.40 mg (0.0378 mmol) | 14.2 mg 0.224 mmol |
| $Cu^{2+}$ recovered | 0.50 mg (0.00785 mmol) | 2.17 mg (0.0342 mmol) | 1.55 mg (0.0244 mmol) | 10.57 mg (0.1663 mmol) |
| $Cu^{2+}$ bound | 0.71 mg (0.011 mmol) | 1.26 mg (0.0198 mmol) | 0.85 mg (0.013 mmol) | 3.6 mg (0.057 mmol) |
| % binding | 42% | 76% | 63% | 42% |
| % extraction | 59% | 37%* | 35%* | 25%* |
| mmol $Cu^{2+}$/ g polymer | 0.067 | 0.121 | 0.065 | 0.044 |
| mg $Cu^{2+}$/ g polymer | 4.3 | 7.7 | 4.3 | 2.8 |
| mmol $Cu^{2+}$/L | 0.55 | 3.1 | 0.65 | 8.9 |

Based on the feed ratio of the monomers used in the polymer synthesis.
*Less than a stoichiometric amount of ligand was used.

EXAMPLE 8

Europium Extraction Studies

An extraction of $EuCl_3 \cdot 6H_2O$ was attempted using the acetoacetate copolymer in a high pressure cell with three windows suitable for luminescence experiments. At 25° C. and 2000 psi, no europium emission was detected indicating that Eu(III) was not being solubilized in $CO_2$. Therefore, extraction studies were attempted with the phosphonate functionalized copolymer prepared in Example III.

A 7 mL high pressure cell equipped with three sapphire windows was charged with solid $EuCl_3 \cdot 6H_2O$ (pulverized) (0.032 g, 0.087 mmol, 1 equiv.) and phosphonate functionalized polymer (1.28 g, approximately 0.26 mmol phosphonate functionality, 3 equiv.). At 2000 psi and 25° C., the phosphonate polmer dissolved with stirring. The extraction was monitored by luminescence spectroscopy. Europium emission was observed, and data are given in FIG. 3.

Figure 3:
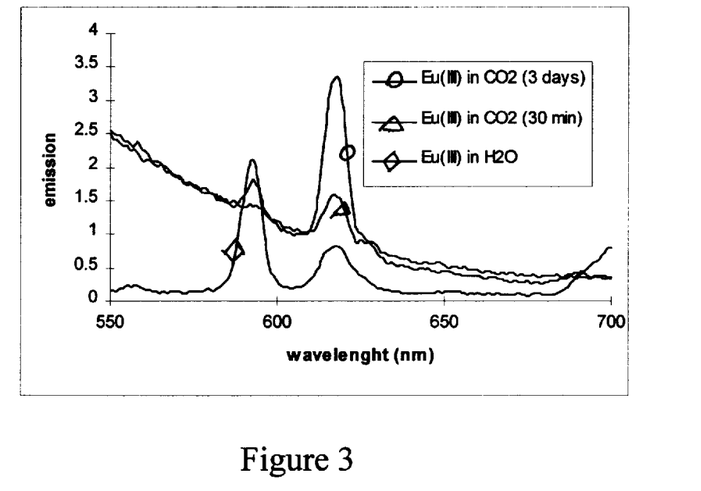
FIG. 3 graphically illustrates the extraction of europium in carbon dioxide with a polymer of the present invention.

After extended stirring (>one week) to insure complete extraction, the polymer with was flushed out of the cell by purging with pure $CO_2$ while maintaining the pressure at 2000 psi. 0.011 g of europium salt was not extracted and remained in the cell. As in the copper extraction with acetoacetate copolymer, extraction of europium is fairly quantitative.

EXAMPLE 9

Competition Studies

Competition studies were carried out that determined that selective metal extractions are also possible. The acetoacetate functionalized polymer selectively extracted only the copper salt into $CO_2$ when both copper and europium salts were present. A similar extraction to that described above was carried out with 0.0319 g (0.087 mmol) $EuCl_3 \cdot 6H_2O$ and 0.0268 g (0.12 mmol) of $Cu(NO_3)_2 \cdot 2(H_2O)$ and 1.17 g (0.239 mmol acetoacetate functionality) of acetoacetate copolymer. The cell was pressurized to 2000 psi and the extraction was monitored both by UV-vis and by luminescence spectroscopy. Copper extraction was evident by UV-vis and no emission was observed for europium. Copper was selectively extracted into $CO_2$ without extraction of europium demonstrating that metal separations with this type of $CO_2$-soluble copolymer are feasible.

The foregoing is illustrative of the present invention, and is not to be construed as limiting thereof. The invention is defined by the following claims, with equivalents of the claims to be included therein.

We claim:

1. A composition useful for the extraction of metals and metalloids, comprising:
   (a) a solvent comprising carbon dioxide; and
   (b) a polymer in said carbon dioxide, said polymer having bound thereto a ligand that binds said metal or metalloid; with said ligand bound to said polymer at a plurality of locations along the chain length thereof.

2. A composition according to claim 1, wherein said carbon dioxide is liquid carbon dioxide.

3. A composition according to claim 1, wherein said carbon dioxide is supercritical carbon dioxide.

4. A composition according to claim 1, wherein said polymer is included in said composition in an amount of from about 0.01 to about 40 percent by weight.

5. A composition according to claim 1, further comprising a cosolvent, wherein said cosolvent is included in said composition in an amount of from about 0.001 to about 30 percent by weight.

6. A composition according to claim 1, wherein said polymer is a fluoroacrylate polymer.

7. A composition according to claim 6, wherein said fluoroacrylate polymer is a copolymer.

8. A composition according to claim 1, wherein said ligand is selected from the group consisting of β-diketone, phosphate, phosphonate, phosphinic acid, alkyl and aryl phosphine oxide, thiophosphinic acid, dithiocarbamate, amino, ammonium, hydroxyoxime, hydroxamic acid, calix (4)arene, macrocyclic, 8-hydroxyquinoline, picolylamine, thiol, and carboxylic acid ligands.

9. A method of extracting metals and metalloids, comprising:

(a) contacting a first composition containing a metal or metalloid to be extracted with a second composition, said second composition comprising (i) a solvent comprising carbon dioxide, and (ii) a polymer in said carbon dioxide, said polymer having bound thereto a ligand that binds said metal or metalloid; with said ligand bound to said polymer at a plurality of locations along the chain length thereof; and then (b) extracting said metal or metalloid from said first composition into said second composition.

10. A method according to claim 9, wherein said contacting and extracting steps are batch steps.

11. A method according to claim 9, wherein said contacting and extracting steps are continuous steps.

12. A method according to claim 9, wherein said first composition is a solid.

13. A method according to claim 9, wherein said first composition is a liquid.

14. A method according to claim 9, wherein said second composition is a liquid.

15. A method according to claim 9, wherein said second composition is a supercritical fluid.

16. A method according to claim 9, wherein said extracting step is followed by the step of:

(c) separating said first composition from said second composition.

17. A method according to claim 16, wherein said separating step is followed by the step of:

(d) separating said carbon dioxide from said polymer.

18. A method according to claim 16, wherein said separating step is followed by the step of:

(d) separating said metal or metalloid from said polymer.

19. A composition, comprising:

(a) a solvent comprising carbon dioxide;

(b) a polymer in said carbon dioxide, said polymer having bound thereto a ligand that binds a metal or metalloid; with said ligand bound to said polymer at a plurality of locations along the chain length thereof; and (c) a metal or metalloid bound to said polymer by said ligand.

20. A composition according to claim 19, wherein said carbon dioxide is liquid carbon dioxide.

21. A composition according to claim 19, wherein said carbon dioxide is supercritical carbon dioxide.

22. A composition according to claim 19, wherein said polymer is included in said composition in an amount of from about 0.01 to about 40 percent by weight.

23. A composition according to claim 19, further comprising a cosolvent, wherein said cosolvent is included in said composition in an amount of from about 0.001 to about 30 percent by weight.

24. A composition according to claim 19, wherein said polymer is a fluoroacrylate polymer.

25. A composition according to claim 24, wherein said fluoroacrylate polymer is a copolymer.

26. A composition according to claim 19, wherein said ligand is selected from the group consisting of β-diketone, phosphate, phosphonate, phosphinic acid, alkyl and aryl phosphine oxide, thiophosphinic acid, dithiocarbamate, amino, ammonium, hydroxyoxime, hydroxamic acid, calix(4)arene, macrocyclic, 8-hydroxyquinoline, picolylamine, thiol, and carboxylic acid ligands.

27. A composition according to claim 19, wherein said metal is a conductor.

28. A method for the separation of metals and metalloids from a carrier medium, comprising:

(a) providing as a carrier medium a composition comprising (i) a solvent comprising carbon dioxide, (ii) a polymer in said carbon dioxide, said polymer having bound thereto a ligand that binds said metal or metalloid; with said ligand bound to said polymer at a plurality of locations along the chain length thereof; and (iii) a metal or metalloid bound to said polymer by said ligand; and then (b) separating said polymer from said carbon dioxide to thereby separate said polymer from said carrier medium.

29. A method according to claim 28, further comprising the step of separating said metal or metalloid from said polymer after said step of separating said polymer from said carbon dioxide.

30. A method according to claim 28, wherein said separating step is carried out by venting.

31. A method according to claim 28, wherein said separating step is carried out by spraying.

32. A method according to claim 28, wherein said separating step is carried out by spraying said polymer onto a substrate to coat said substrate with said polymer.

33. A composition useful for the extraction of metals and metalloids, comprising:

(a) a solvent comprising carbon dioxide; and (b) a fluoropolymer in said carbon dioxide, said fluoropolymer having bound thereto a ligand that binds said metal or metalloid; with said ligand bound to said fluoropolymer at a plurality of locations along the chain length thereof.

34. A composition according to claim 33, wherein said carbon dioxide is liquid carbon dioxide.

35. A composition according to claim 33, wherein said carbon dioxide is supercritical carbon dioxide.

36. A composition according to claim 33, wherein said fluoropolymer is included in said composition in an amount of from about 0.01 to about 40 percent by weight.

37. A composition according to claim 33, further comprising a cosolvent, wherein said cosolvent is included in said composition in an amount of from about 0.001 to about 30 percent by weight.

38. A composition according to claim 33, wherein said fluorpolymer is a fluoroacrylate polymer.

39. A composition according to claim 38, wherein said fluoroacrylate polymer is a copolymer.

40. A composition according to claim 38, wherein said ligand is selected from the group consisting of β-diketone, phosphate, phosphonate, phosphinic acid, alkyl and aryl phosphine oxide, thiophosphinic acid, dithiocarbamate, amino, ammonium, hydroxyoxime, hydroxamic acid, calix(4)arene, macrocyclic, 8-hydroxyquinoline, picolylamine, thiol, and carboxylic acid ligands.

41. A composition, comprising:

(a) a solvent comprising carbon dioxide;

(b) a fluoropolymer in said carbon dioxide, said fluoropolymer having bound thereto a ligand that binds a metal or metalloid; with said ligand bound to said fluoropolymer at a plurality of locations along the chain length thereof; and (c) a metal or metalloid bound to said polymer by said ligand.

42. A composition according to claim 41, wherein said carbon dioxide is liquid carbon dioxide.

43. A composition according to claim 41, wherein said carbon dioxide is supercritical carbon dioxide.

44. A composition according to claim 41, wherein said fluoropolymer is included in said composition in an amount of from about 0.01 to about 40 percent by weight.

45. A composition according to claim 41, further comprising a cosolvent, wherein said cosolvent is included in said composition in an amount of from about 0.001 to about 30 percent by weight.

46. A composition according to claim 41, wherein said fluorpolymer is a fluoroacrylate polymer.

47. A composition according to claim 46, wherein said fluoroacrylate polymer is a copolymer.

48. A composition according to claim 41, wherein said ligand is selected from the group consisting of β-diketone, phosphate, phosphonate, phosphinic acid, alkyl and aryl phosphine oxide, thiophosphinic acid, dithiocarbamate, amino, ammonium, hydroxyoxime, hydroxamic acid, calix(4)arene, macrocyclic, 8-hydroxyquinoline, picolylamine, thiol, and carboxylic acid ligands.

49. A composition according to claim 41, wherein said metal is a conductor.

* * * * *